Sept. 16, 1941.   P. CHAFFIN   2,256,379
TRACTION WHEEL AND CLEAT THEREFOR
Filed Aug. 29, 1939
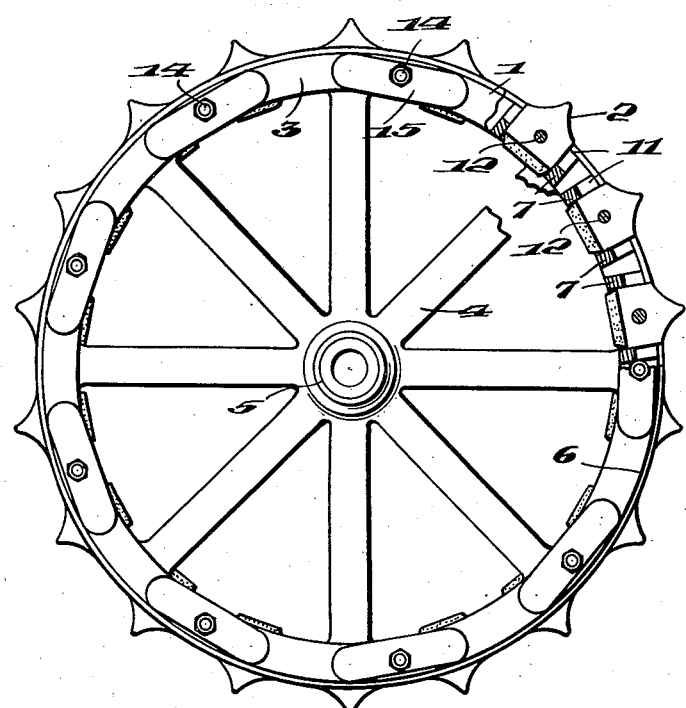
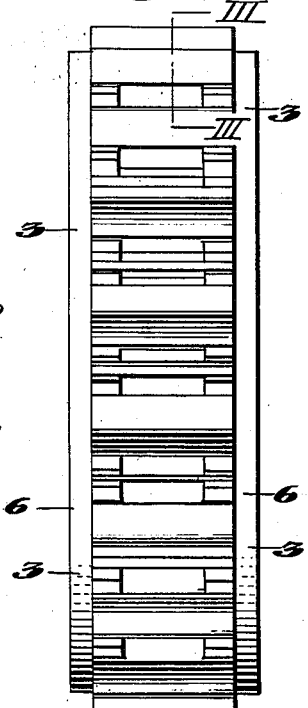
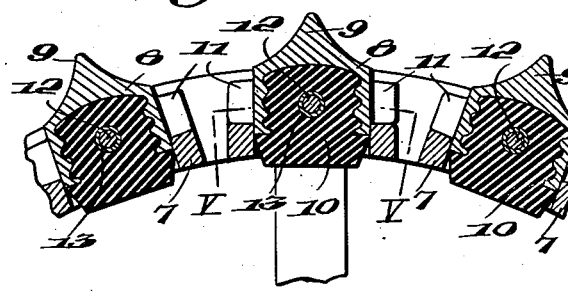
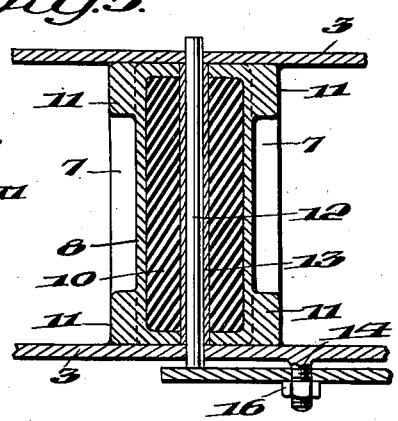
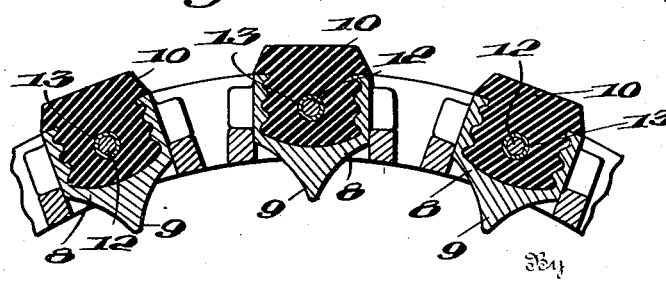
Inventor
Paul Chaffin,
Attorney Patented Sept. 16, 1941

2,256,379

UNITED STATES PATENT OFFICE 2,256,379

TRACTION WHEEL AND CLEAT THEREFOR

Paul Chaffin, Washington Court House, Ohio, assignor to John H. Hoppes, Washington Court House, Ohio Application August 29, 1939, Serial No. 292,496

9 Claims. (Cl. 301—50)

In general, this invention relates to tractors. More particularly, it is directed to an improved wheel for use on tractors to adapt the machines for travel on the fields or on the hard surfaced highways.

Many devices of this character have been provided but so far all have been objectionable because they did not meet the requirements for efficient travel both on the highway and in the fields, being admirably suited for one and entirely unsuitable for the other.

For a long time it has been an object of tractor manufacturer to provide a wheel which may be used on hard surfaced roads without danger of scarring, cutting and otherwise marring them, and wheels have been provided with reversible cleats to make them suitable for both highway and field use. Such a wheel formed the subject of my Patent No. 2,171,844 to issue September 5, 1939.

The object of this invention resides in the provision of a wheel of the same type shown in my above-mentioned patent but which has additional advantages in that it is stronger, more economically manufactured, and more readily changed for travel on different type roadways.

Another object rests in providing a wheel of the type mentioned above which will permit any desired number of cleats to be reversed while the rest may be retained in the same order. Thus, if the tractor be driven along a hard surface to a substantially dry field, it may be found desirable to change only a few of the cleats to give the wheels traction. This partial change of the wheel is possible with the present construction whereas in the form shown in my prior patent, all the cleats were required to be reversed.

A still further object of the invention resides in providing a wheel with cleats which can be bodily removed from the main frame portion of the wheel and reversed, thus eliminating the pivot means employed in many of the prior wheels. By eliminating the pivots, the wheel can be manufactured with less accuracy and more quickly and the cost of production thereby reduced.

Still another object resides in forming a wheel frame with means for locking the cleat in operative position, the relation between the cleat receiving and locking means being such that the latter will be effective regardless of which position of operation the cleat occupies.

Additional objects will be apparent from the following description and the accompanying drawing in which a tractor wheel formed in accordance with the preferred form of the invention has been illustrated in detail.

In the drawing:

Fig. 1 is a side elevational view of a traction wheel formed in accordance with the present invention;

Fig. 2 is a front elevational view of the wheel shown in Fig. 1;

Fig. 3 is a detail vertical sectional view taken through a portion of the wheel on the plane indicated by the line III—III of Fig. 2 and showing the cleat members in position for operation in a field;

Fig. 4 is a similar view showing the cleats reversed for operation on a hard surfaced road;

Fig. 5 is a detail horizontal sectional view taken on the plane indicated by the line V—V of Fig. 3.

Referring more particularly to the drawing, the numeral 1 designates the improved traction wheel in its entirety and the numeral 2 designates generally the cleat members with which the wheel 1 is provided. The wheel 1 is formed from a pair of transversely spaced rim members 3 having spokes 4 extending inwardly to a hub 5. The formation of the hub is not important in this invention since the size and shape of this member will depend upon the axle to which the wheel is attached.

The rim members 3 have laterally projecting flanges 6 formed therewith to protect the mechanism used to secure the cleats to the rim members. The flanges also serve to reenforce the rims to prevent their distortion during use. The rim members 1 are connected by transversely extending bars 7 which are arranged in circumferentially spaced sets, the bars of each set also being spaced to permit the cleats 2 to be positioned therebetween, the spacing being substantially equal to the thickness of the cleats to prevent relative movement between the cleats and the bars.

In the preferred form of the invention, the bars are formed integrally with the rim members to provide a rigid frame to withstand the great stresses placed upon the wheel when in active operation. Each cleat 2 includes an elongated body 8 formed of metal, the body being hollow and having one open side, the wall opposed to the open side having an outwardly directed sharp projection 9 formed therewith. This projection forms a part of the body and constitutes the ground engaging member when the cleat is in position for use in the field. The body of the cleat is made hollow to receive a resilient block 10, a portion of which projects through the open face of the body 8 to form a resilient projection on the side opposite the projection 9. The inner side walls of the body 8 are roughened to more firmly secure the block 10 therein, this member also being vulcanized after being positioned in the block to secure it in place and prevent withdrawal thereof when the wheel is in operation.

Short lug members 11 project outwardly from the side walls of the body in planes disposed at right angles to the faces from which the projections extend. The lug members are formed for engagement with the outer surfaces of the bars 7, these surfaces being disposed at such a distance from the outer peripheries of the rims 1 that the projections on the cleats will extend beyond the rims far enough to engage the roadway.

To maintain the lug members in engagement with the bars, the rims are provided with registering openings to receive dowel pins 12 which also extend through an opening formed in the block 8. In the present showing, this opening has a sleeve 13 disposed therein which sleeve is substantially equal in length to the body 8 in order that the ends of the sleeve will be positioned in the end walls of the body. If desired, when the sleeve is positioned in the body during manufacture, the ends of the sleeve may be welded or riveted to secure the sleeve in the body and prevent longitudinal movement thereof. By extending the sleeve through the cleat, this member will also serve to hold the rubber block in the body 8 in the event the block tends to be dislodged when it engages the road surface.

It will be noted from Fig. 5 that the locking pins 12 are longer than the distance between the outer surfaces of the rim members so that the ends of the pins will project beyond the rims where they may be engaged by a hammer to facilitate their removal in the operation of reversing the cleats.

Preferably the pins 12 are of tapered formation which will permit their ready removal after having once been loosened by being struck on the small end with a sledge hammer. It is essential to the successful use of the cleat to locate the longitudinal axis of the opening in the plane which bisects the lug members at both sides of the body 8. By this construction, the same locking pins can be used regardless of whether the metal projection or the rubber projection is disposed outwardly.

To prevent the undesired removal of the pins 12, the outer rim has a stud 14 secured thereto between spaced sets of cleats. Each stud receives a plate 15 which extends away from the stud in both directions, each end registering with and engaging a locking pin 12. Lock nuts 16 are threaded upon the studs to prevent the plates 15 from being released during the periods of active operation of the wheel.

From Fig. 1, it will be apparent that the plates 15 and the studs and nuts are disposed within the confines of the laterally projecting flanges of the rim members and will thereby be protected against injury as the wheel rolls over obstructions. The flanges on the rim members also serve to prevent pivotal movement of the plates 15 on the studs, thereby necessitating only one stud for each plate. This provision reduces the labor necessary when changing the studs to adapt the wheel for use on a different type of roadway.

In Fig. 3, the metal projections are disposed outwardly to set the wheel for operation in the field or on other yieldable surfaces. When it is desired to run the tractor on hard surfaced roads, the pins 12 will be removed and the cleats bodily reversed to position the rubber projections outwardly as illustrated in Fig. 4. The pins are then replaced to lock the cleats in this position. If the earth in the field is sufficiently hard, the cleat may be retained in the position shown in Fig. 4, reversal of the cleats being required only when the ground on which the wheels are to be run is soft.

While the invention has been shown in its preferred form, numerous changes may be made in the construction and relation of parts without departing from the spirit and scope of the invention as set forth in the following claims.

What is claimed is:

1. A tractor wheel comprising spaced rim members, spaced sets of transversely extending bars joining said rim members, a cleat removably positioned in the space between the bars of each set, said cleats each having a body portion, a sharpened projection on one side of said body portion, a resilient pad on the opposite side of said body portion, lug means projecting from opposed sides of said body and engaging said bars, and means removably received by said rims and cleats for holding said lug means in engagement with said bars.

2. A tractor wheel comprising spaced rim members, spaced sets of transversely extending bars joining said rim members, a cleat removably positioned in the space between the bars of each set, said cleats each having a body portion, a sharpened projection on one side of said body portion, a resilient pad on the opposite side of said body portion, lug means projecting from opposed sides of said body and engaging said bars, said rims being formed with registering openings between the bars of each set, each body having an opening extending horizontally therethrough, the longitudinal axis of said opening being disposed in a plane bisecting the lugs at opposite sides of said body, and pin means extending through the openings in said rims and cleats to retain said cleats on the wheel.

3. In a tractor wheel, a pair of rim members, transversely extending pairs of spaced bars joined with said rim members, cleat members having opposed rigid and resilient projections removably disposed between the bars of each of said cleat pairs, said cleat members having seating engagement with at least two of said bars and being reversible to present either projection to the ground surface, and locking means for holding said cleat members in seated engagement with said bars, said locking means being operative without regard to the projection disposed exteriorly of the wheel.

4. In a tractor wheel, a pair of spaced rim members, a cleat disposed between said rims, a bar joining said rims at each side of said cleat, the spacing between the bars being substantially equal to the thickness of said cleat, lug means projecting from the sides of said cleat and engaging the outer surfaces of said bars, a rigid projection formed on one surface of said cleat, a resilient projection provided on the opposite surface of said cleat, and means for holding said lug means in engagement with said bars with either the rigid or resilient projection disposed outwardly.

5. In a tractor wheel, a pair of transversely spaced rim members, a plurality of circumferentially spaced sets of bar members extending between said rim members, the bars of each set being spaced, a cleat member disposed between the bars of each set, the thickness of said cleats being substantially equal to the width of the space between said bars, lug means projecting from opposite sides of said cleats and engaging the outer surfaces of said bars, said rims and cleat members being provided with perforations adapted to register when said lugs engage said bars, retaining pin means extending through the registering perforations to hold said cleats on said wheel, and plate members secured to the outer side of one rim member and engaging said pins to prevent undesired removal thereof.

6. In a tractor wheel, a pair of transversely spaced rim members, a plurality of circumferentially spaced sets of bar members extending between said rim members, the bars of each set being spaced, a cleat member disposed between the bars of each set, the thickness of said cleats being substantially equal to the width of the space between said bars, lug means projecting from opposite sides of said cleats and engaging the outer surfaces of said bars, said rims and cleat members being provided with perforations adapted to register when said lugs engage said bars, retaining pin means extending through the registering perforations to hold said cleats on said wheel, a stud member projecting from the outer surface of one rim member between alternate sets of transversely extending bars, and a plate member secured to each stud, the end portions of said plates engaging said retaining pins to prevent accidental displacement thereof.

7. In a traction wheel, a reversible cleat comprising a rectangular box-like hollow body having one open side, a sharp edge projecting outwardly from the side opposite the open side, longitudinally extending corrugations provided on the inner surfaces of the other sides, a resilient block disposed within said body and projecting through said open side, a sleeve member extending through said resilient block and the end walls of said body, said sleeve and corrugations cooperating to retain said block in said body, and lug means projecting from a pair of opposed sides of said body, said lug means being of a width less than that of the sides to which they are connected and being so located on said body as to be bisected by a plane passing through the longitudinal axis of said sleeve.

8. In a traction wheel, a cleat comprising a block-like body having top, bottom, side and end faces, a sharp projection formed on the top face, and shoulder-forming lug means projecting from the side faces of said body, the shoulder-forming surfaces of said lug means being spaced from the longitudinal edges of said side faces.

9. In a traction wheel, a cleat comprising a block-like body having top, bottom, side and end faces, a sharp projection formed on the top face, and shoulder-forming lug means projecting from the side faces of said body, the shoulder-forming surfaces of said lug means being spaced equidistantly from the nearest longitudinal edges of the side face from which the lug projects.

PAUL CHAFFIN.